(12) United States Patent
Arai (10) Patent No.: US 7,615,756 B2
(45) Date of Patent: Nov. 10, 2009

(54) APPARATUS FOR AND METHOD OF CAPTURING RADIATION IMAGE

(75) Inventor: Takahisa Arai, Ebina (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/046,112

(22) Filed: Mar. 11, 2008

(65) Prior Publication Data

US 2008/0224057 A1      Sep. 18, 2008

(30) Foreign Application Priority Data

Mar. 12, 2007   (JP)  ............................ 2007-062264

(51) Int. Cl.
*H01L 27/146* (2006.01)
*H01L 27/00* (2006.01)
(52) U.S. Cl. ............................. 250/370.09; 250/370.08
(58) Field of Classification Search ............ 250/370.09, 250/370.01, 370.08; 378/48, 98.9, 98.11
See application file for complete search history.

(56) References Cited

U.S. PATENT DOCUMENTS

| | | | | |
|---|---|---|---|---|
| 4,639,867 A | * | 1/1987 | Suzuki et al. ............ | 378/98.12 |
| 6,497,511 B1 | * | 12/2002 | Schmitt et al. ............. | 378/207 |
| 6,606,739 B2 | * | 8/2003 | Kanatake et al. .............. | 716/21 |
| 7,184,518 B2 | * | 2/2007 | Chmeissani et al. ........ | 378/98.8 |
| 2002/0085667 A1 | | 7/2002 | Miller | |

FOREIGN PATENT DOCUMENTS

| | | |
|---|---|---|
| JP | 2003578 A | 1/2003 |
| JP | 2004154409 A | 6/2004 |

\* cited by examiner

*Primary Examiner*—David P Porta
*Assistant Examiner*—Faye Boosalis
(74) *Attorney, Agent, or Firm*—Sughrue Mion, PLLC (57) ABSTRACT

While a solid-state detector is not being irradiated with a radiation, unexposed image data R0 are acquired from an exposure area of the solid-state detector and non-exposure image data r0 are acquired from a non-exposure area, which is shielded by a shield plate against exposure to the radiation, of the solid-state detector. Then, while the solid-state detector is being irradiated with the radiation through a subject, exposed image data Rn are acquired from the exposure area, and non-exposure image data rn are acquired from the non-exposure area. The exposed image data Rn are corrected according to Rn−R0−(rn−r0) or Rn−R0×(rn/r0).

5 Claims, 7 Drawing Sheets

APPARATUS FOR AND METHOD OF CAPTURING RADIATION IMAGE

BACKGROUND OF THE INVENTION

1. Field of the Invention

The present invention relates to an apparatus for and a method of capturing a radiation image of a subject by applying a radiation emitted from a radiation source to the subject and detecting the radiation that has passed through the subject with a radiation detector.

2. Description of the Related Art

In the medical field, there have widely been used radiation image capturing apparatus which apply a radiation emitted from a radiation source to a subject and detect the radiation that has passed through the subject with a radiation detector.

One known radiation detector for use in the radiation image capturing apparatus includes a solid-state detector in a laminated structure comprising a matrix of charge collecting electrodes disposed on an insulating substrate and a radiation conductor disposed on the charge collecting electrodes for generating electric charges depending on the radiation that is applied. The electric charges generated by the radiation conductor and representing radiation image information are collected by the charge collecting electrodes and temporarily stored in an electric storage unit. The collected electric charges stored in the electric storage unit are converted into an electric signal, which is output from the solid-state detector. Other known radiation detectors include a radiation detector comprising a charge-coupled device (CCD) and a radiation detector comprising a combination of amorphous silicon and a scintillator.

The radiation image capturing apparatus are required to acquire high-quality radiation images. The radiation detector that is used in the radiation image capturing apparatus is highly sensitive and hence is highly susceptible to the temperature of the environment in which it is used. While the radiation image capturing apparatus are in operation, offset data of the radiation detector may vary, tending to adversely affect the radiation images that are acquired. Furthermore, since a high voltage is applied to the solid-state detector of the radiation detector, the acquired radiation images may be altered due to fluctuations of the voltage. The offset data may also vary due to a time-dependent change in the sensitivity of the solid-state detector.

Japanese laid-open patent publication No. 2003-578 discloses a process of correcting variations of the offset data.

Figure 7:
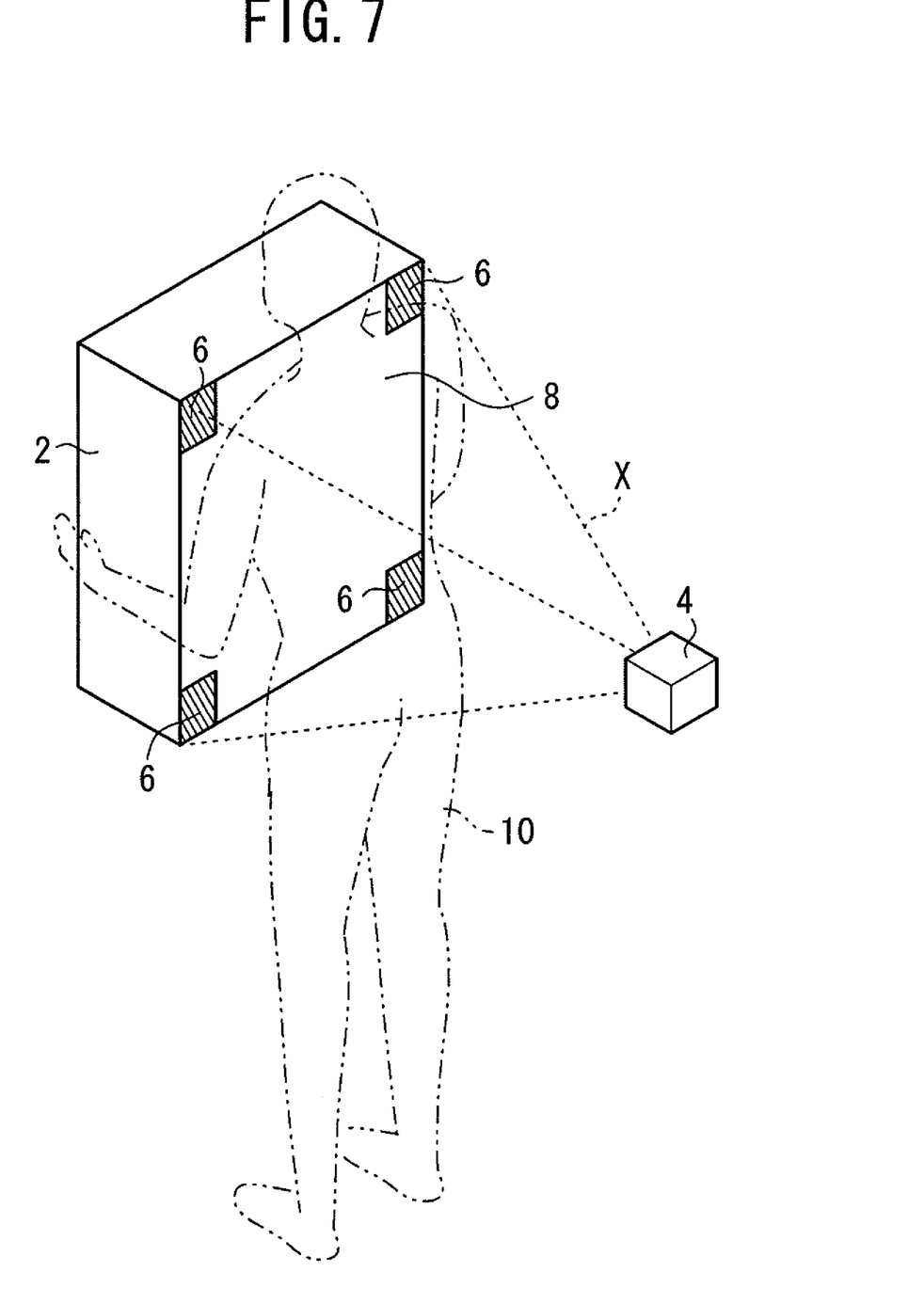
FIG. 7 is a schematic perspective view illustrative of a process of correcting variations of offset data according to the related art.

According to the disclosed process, as shown in FIG. 7 of the accompanying drawings, a radiation detector 2 has non-exposure areas 6 on the respective corners thereof which comprise sheets of a material such as lead or the like that is impermeable to a radiation X emitted from a radiation source 4. A radiation image of a subject 10 which is recorded in an exposure area 8 of the radiation detector 2 is corrected using reference data obtained from the non-exposure areas 6 and dark-image offset data obtained from the exposure area 8 when it is not irradiated with the radiation X.

The radiation image obtained from the exposure area 8 is adjusted by the dark-image offset data, and a variation of the radiation image due to a temperature change, etc. is corrected by the reference data.

According to the disclosed process, however, if the state of the apparatus at the time the dark-image offset data are acquired and the state of the apparatus at the time the radiation image is captured are different from each other, then since the dark-image offset data are lowered in reliability, the radiation image cannot be corrected highly accurately. For correcting the radiation image highly accurately, it is necessary to minimize the interval between the time at which the dark-image offset data are acquired and the time at which the radiation image is captured. If dark-image offset data are acquired before a radiation image is captured in each image capturing cycle, then the entire image capturing process is disrupted.

SUMMARY OF THE INVENTION

It is a general object of the present invention to provide an apparatus for and a method of capturing a highly accurate radiation image by efficiently acquiring corrective image data through a required minimum number of correcting cycles.

A major object of the present invention is to provide an apparatus for and a method of capturing a highly accurate radiation image without being adversely affected by temperature variations.

Another object of the present invention is to provide an apparatus for and a method of capturing a highly accurate radiation image without being adversely affected by a time-dependent change in the sensitivity of a radiation detector.

Still another object of the present invention is to provide an apparatus for and a method of capturing a radiation image through a highly accurate correcting process based on the acquisition of accurate dark-image offset data of a radiation detector.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
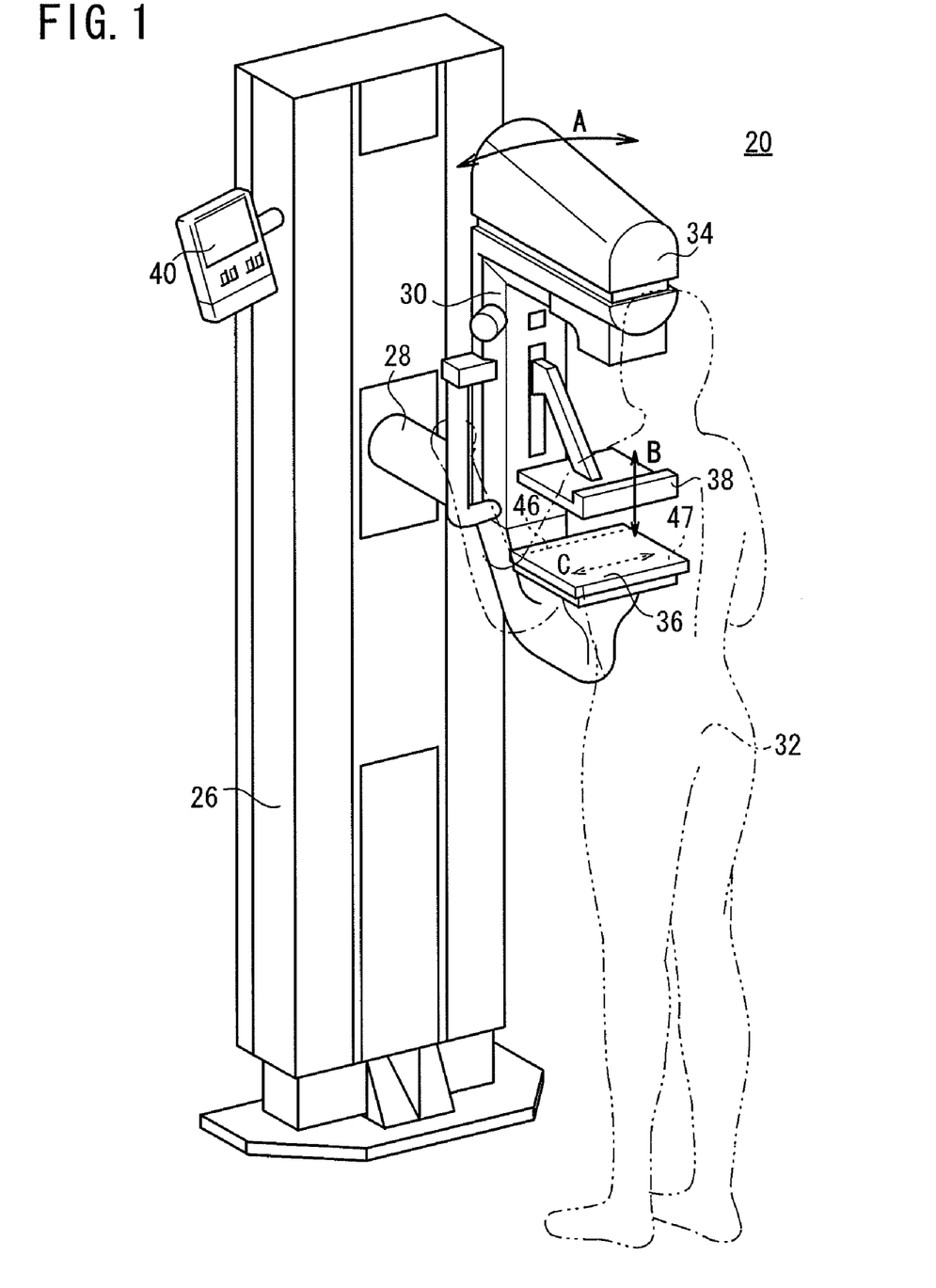
FIG. 1 is a perspective view of a mammographic apparatus according to an embodiment of the present invention.

FIG. 1 shows in perspective a mammographic system 20 according to an embodiment of the present invention, to which an apparatus for and a method of capturing a radiation image according to the present invention are applied.

As shown in FIG. 1, the mammographic system 20 includes an upstanding base 26, a vertical arm 30 fixed to a horizontal swing shaft 28 disposed substantially centrally on the base 26, a radiation source housing unit 34 storing a radiation source 22 (see FIG. 3) for applying a radiation X to a breast 44 (see FIG. 2) to be imaged of a subject 32 and fixed to an upper end of the arm 30, an image capturing base 36 housing a solid-state detector (radiation detector) 24 (see FIGS. 2 and 3) for detecting the radiation X that has passed through the breast 44 and fixed to a lower end of the arm 30, and a compression plate 38 for compressing and holding the breast 44 against the image capturing base 36.

When the arm 30, to which the radiation source housing unit 34 and the image capturing base 36 are secured, is angularly moved about the swing shaft 28 in the directions indicated by the arrow A, an image capturing direction with respect to the breast 44 of the subject 32 is adjusted. The compression plate 38 that is coupled to the arm 30 is disposed between the radiation source housing unit 34 and the image capturing base 36. The compression plate 38 is vertically displaceable along the arm 30 in the directions indicated by the arrow B.

To the base 26, there is connected a display control panel 40 for displaying image capturing information including an image capturing region, an image capturing direction, etc. of the subject 32 detected by the mammographic system 20, the ID information of the subject 32, etc., and setting these items of information, if necessary.

Figure 2:
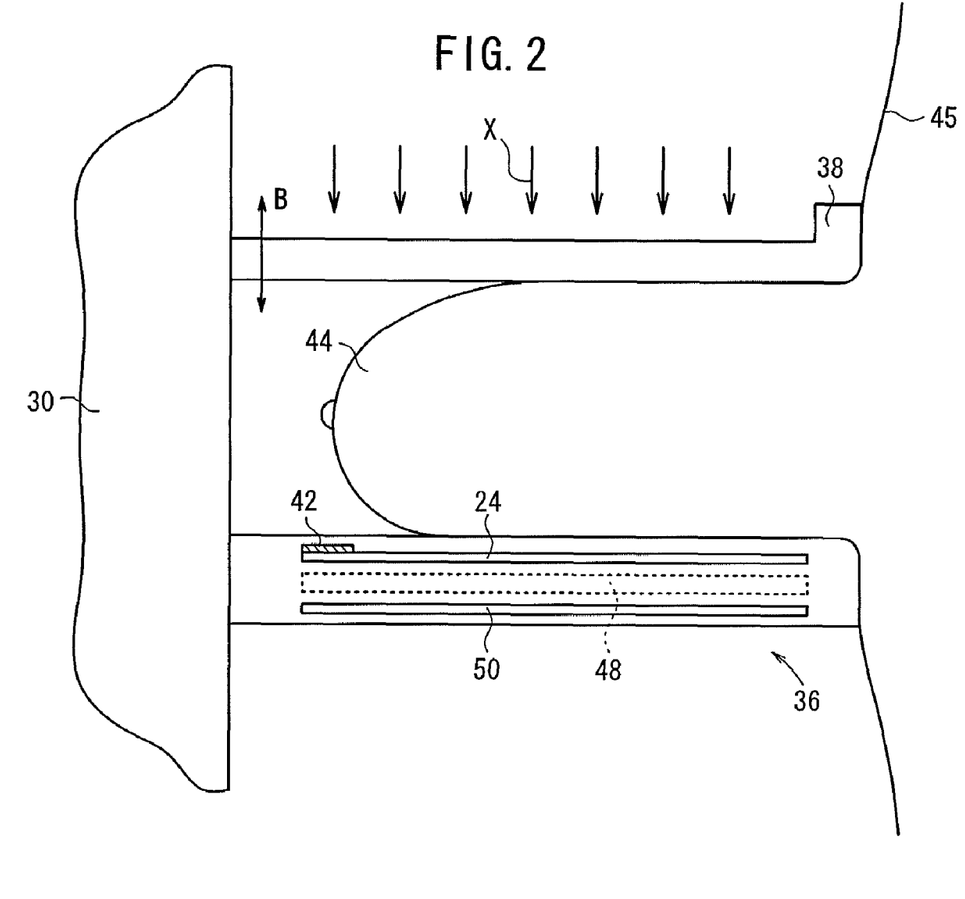
FIG. 2 is a fragmentary vertical elevational view, partly in cross section, showing internal structural details of an image capturing base of the mammographic apparatus according to the embodiment of the present invention.

FIG. 2 shows internal structural details of the image capturing base 36 of the mammographic system 20. In FIG. 2, the breast 44 of the subject 32 is shown as being placed between the image capturing base 36 and the compression plate 38. The reference numeral 45 represents the chest wall of the subject 32.

The image capturing base 36 houses therein a solid-state detector 24 for storing a radiation image captured based on the radiation X that has been emitted from the radiation source 22 and has passed through the breast 44 as electric charge information, a reading light source 48 for applying reading light to the solid-state detector 24 to read the electric charge information stored in the solid-state detector 24, and an erasing light source 50 for applying erasing light to the solid-state detector 24 to remove unwanted electric charges stored in the solid state detector 24.

The solid-state detector 24 comprises a direct-conversion, light-reading radiation solid-state detector, for example. The solid-state detector 24 stores a radiation image based on the radiation X that has passed through the breast 44 as an electrostatic latent image, and generates an electric current depending on the electrostatic latent image when the solid-state detector 24 is scanned by the reading light applied from the reading light source 48.

The solid-state detector 24 may be a detector as disclosed in Japanese laid-open patent publication No. 2004-154409, for example. More specifically, the solid-state detector 24 comprises a laminated assembly of a first electrically conductive layer disposed on a glass substrate for passing the radiation X therethrough, a recording photoconductive layer for generating electric charges upon exposure to the radiation X, a charge transport layer which acts substantially as an electric insulator with respect to latent image polarity electric charges developed in the first electrically conductive layer and which acts substantially as an electric conductor with respect to transport polarity charges which are of a polarity opposite to the latent image polarity electric charges, a reading photoconductive layer for generating electric charges and making itself electrically conductive upon exposure to the reading light, and a second electrically conductive layer which is permeable to the radiation X. An electric energy storage region is provided in the interface between the recording photoconductive layer and the charge transport layer.

Each of the first electrically conductive layer and the second electrically conductive layer provides an electrode. The electrode provided by the first electrically conductive layer comprises a two-dimensional flat electrode. The electrode provided by the second electrically conductive layer comprises a plurality of linear electrodes spaced at a predetermined pixel pitch for detecting the electric charge information of the radiation image to be recorded as an image signal. The linear electrodes are arranged in an array along a main scanning direction, and extend in an auxiliary scanning direction perpendicular to the main scanning direction.

A shield plate 42 made of lead or the like for blocking the radiation X emitted from the radiation source 22 is disposed on the detecting surface of the solid-state detector 24 which is irradiated with the radiation X. The shield plate 42 is positioned in an area which does not impair the capture of a radiation image of the breast 44. Consequently, as shown in FIG. 1, the solid-state detector 24 has a detecting area divided into a non-exposure area 46 where the shield plate 42 is located and an exposure area 47 for capturing a radiation image of the breast 44.

The reading light source 48 includes, for example, a line light source comprising a linear array of LED chips and an optical system for applying a line of reading light emitted from the line light source to the solid-state detector 24. The linear array of LED chips extends perpendicularly to the direction in which the linear electrodes of the second electrically conductive layer of the solid-state detector 24 extend. The line light source moves along the directions, i.e., the directions indicated by the arrow C in FIG. 1, in which the linear electrodes extend to expose and scan the entire surface of the solid-state detector 24.

The erasing light source 50 comprises a plurality of LED chips which can emit and quench light in a short period of time and which have very short persistence. The LED chips are arrayed along a two-dimensional plane parallel to the solid-state detector 24.

Figure 3:
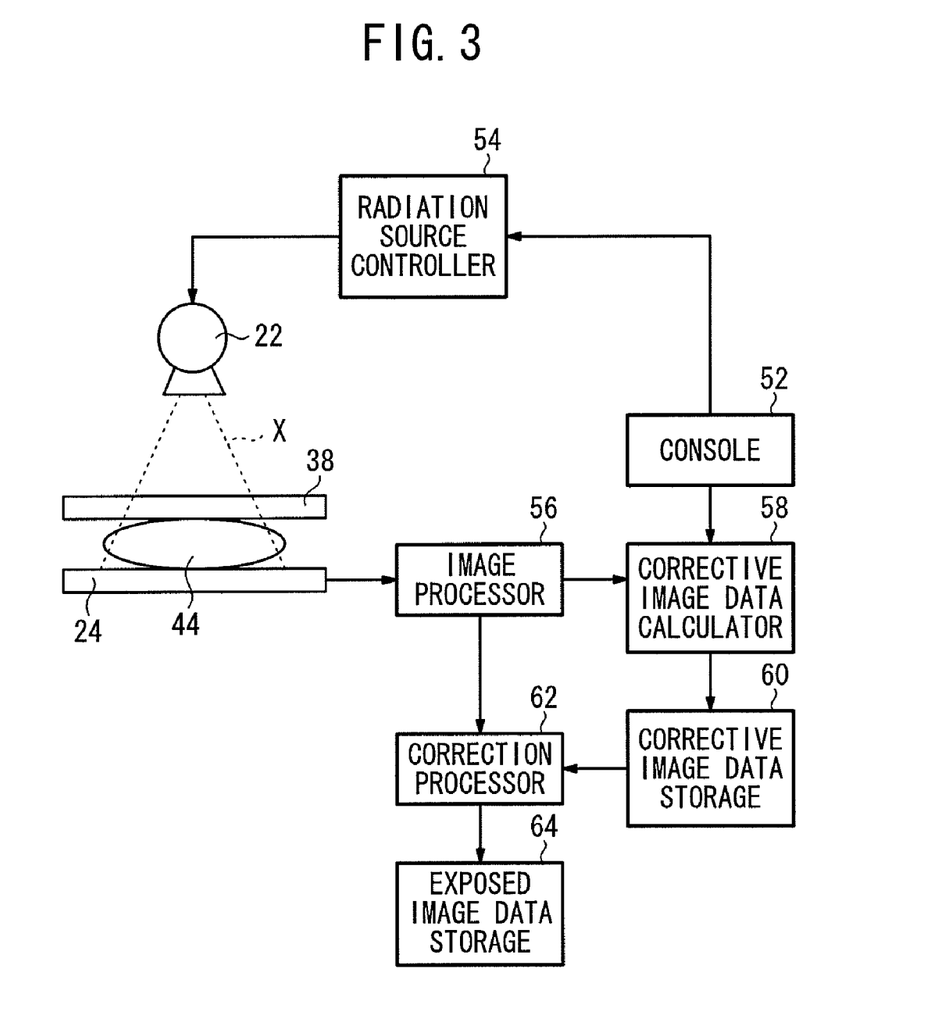
FIG. 3 is a block diagram of a control circuit of the mammographic system according to the embodiment of the present invention.

FIG. 3 shows in block form a control circuit of the mammographic system 20.

As shown in FIG. 3, the mammographic system 20 includes a console 52 for setting subject information about the subject 32, image capturing conditions and an image capturing process for capturing a radiation image, and correcting conditions, to be described later, etc., a radiation source controller 54 for controlling the radiation source 22 according to the set image capturing conditions including a tube current, a tube voltage, the type of a target, an irradiation dose of the radiation X, etc., an image processor 56 for processing exposed image data and corrective image data with respect to the radiation image of the breast 44 which is acquired from the solid-state detector 24, a corrective image data calculator 58 (corrective image data acquiring means) for calculating corrective image data using image data for correction, a corrective image storage 60 for storing the calculated corrective image data, a correction processor 62 (exposed image data correcting means) for correcting exposed image data using the corrective image data, and an exposed image data storage 64 for storing the corrected exposed image data.

The mammographic system 20 according to the present embodiment is basically constructed as described above. Operation of the mammographic system 20 will be described below.

Using the console 52 of the mammographic system 20, the operator, who is typically a radiological technician, sets ID information, image capturing conditions, an image capturing process, etc. for the subject 32. The ID information includes information as to the name, age, sex, etc. of the subject 32, and can be acquired from an ID card or the like owned by the subject 32. If the mammographic system 20 is connected to a network, the ID information can be acquired from a higher-level apparatus through the network. The image capturing conditions include a tube current, a tube voltage, the type of a target, an irradiation dose of the radiation X, etc. for acquiring a suitable radiation image depending on the breast 44 which is a region to be imaged of the subject 32. The image capturing process represents information including a region to be imaged that is specified by the doctor, an image capturing direction that is specified by the doctor, etc. These items of information can be acquired from a higher-level apparatus through the network or can be entered from the console by the radiological technician. The information can be displayed on the display control panel 40 of the mammographic system 20.

Then, the operator places the mammographic system 20 into a certain state according to the specified image capturing process. For example, the breast 44 may be imaged as a cranio-caudal view (CC) taken from above, a medio-lateral view (ML) taken outwardly from the center of the chest, or a medio-lateral oblique view (MLO) taken from an oblique view. Depending on the information of a selected one of these image capturing directions, the operator turns the arm 30 about the swing shaft 28. In FIG. 1, the mammographic system 20 is set to take a cranio-caudal view (CC) of the breast 44.

Then, the operator positions the breast 44 of the subject 32 with respect to the mammographic system 20. For example, the operator places the breast 44 on the image capturing base 36, and thereafter lowers the compression plate 38 toward the image capturing base 36 to hold the breast 44 between the image capturing base 36 and the compression plate 38, as shown in FIG. 2.

After the above preparatory operation has been completed, the operator operates the mammographic system 20 to start to take a radiation image of the breast 44. The radiation source controller 54 controls the tube current supplied to the radiation source 22 to apply the radiation X to the breast 44. The radiation X that has passed through the breast 44 held between the compression plate 38 and the image capturing base 36 is applied to the solid-state detector 24 housed in the image capturing base 36. Now, a radiation image represented by the radiation X that has passed through the breast 44 is recorded as electric charge information in the exposure area 47 (see FIG. 1).

After the radiation image of the breast 44 has been captured, the reading light source 48 moves in the direction indicated by the arrow C (FIG. 2) along the solid-state detector 24 and applies reading light to the solid-state detector 24. In response to the applied reading light, the radiation image recorded in the solid-state detector 24 is read as exposed image data. The read exposed image data are processed by the image processor 56, and then corrected by the correction processor 62 as described later. The corrected exposed image data are then stored in the exposed image data storage 64. The corrected exposed image data may be displayed on the console 52 for the operator to confirm.

In order to prepare the solid-state detector 24 to capture a next radiation image, the solid-state detector 24 from which the radiation image has been read is irradiated with erasing light emitted from the erasing light source 50 to remove unwanted electric charges stored in the solid-state detector 24.

The solid-state detector 24 is susceptible to changes in the temperature of the environment in which it is used and noise from nearby electronic circuits. If offset data set in the solid-state detector 24 varies due to those temperature changes and noise, then they tend to adversely affect the acquired radiation image. Therefore, it is necessary to correct the exposed image data in view of the influential elements.

Figure 4:
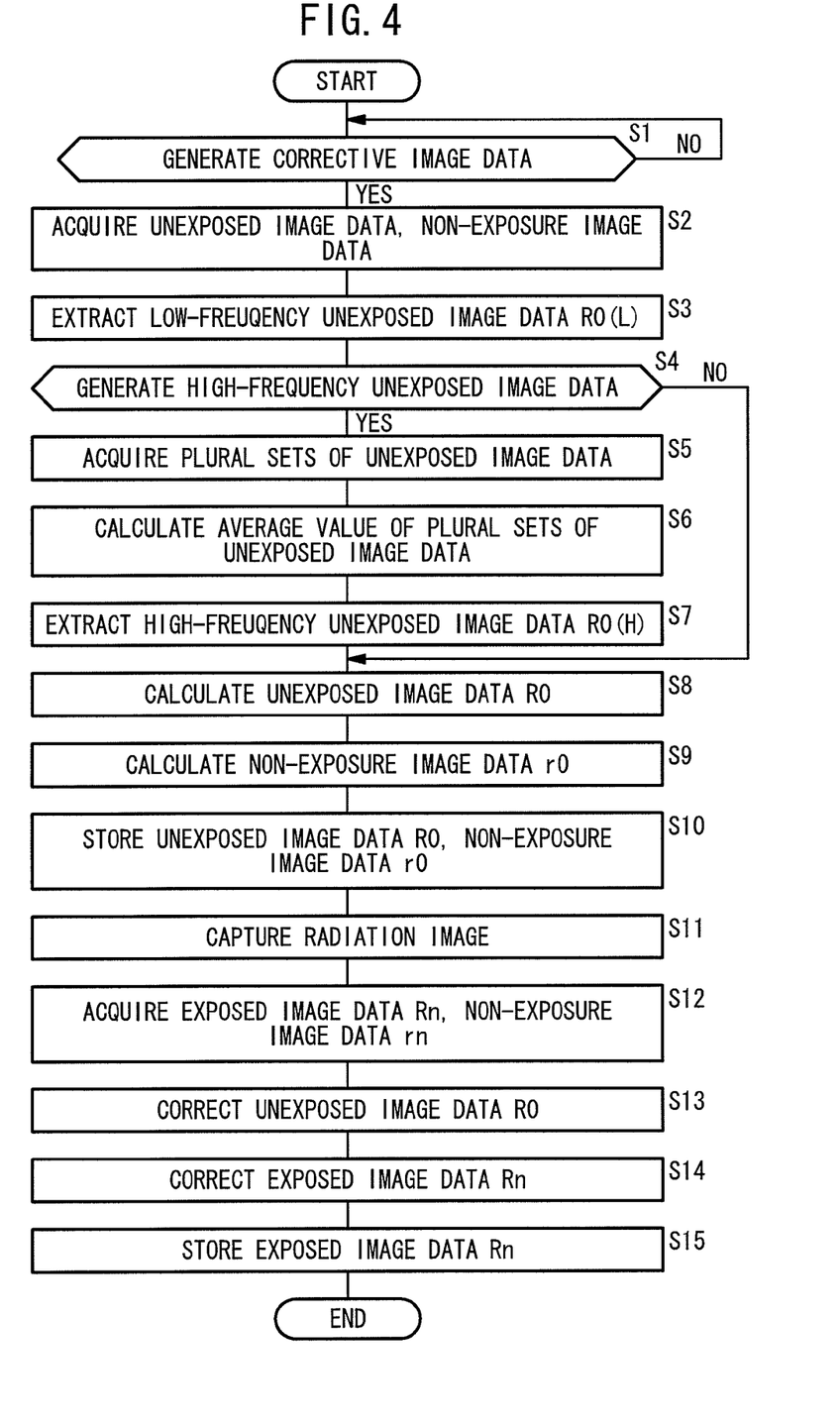
FIG. 4 is a flowchart of a correcting process of the mammographic system according to the embodiment of the present invention.

A process of correcting the exposed image data will be described below with reference to a flowchart shown in FIG. 4.

If the console 52 issues an instruction to generate corrective image data in step S1, the corrective image data calculator 58 starts to generate corrective image data.

After the solid-state detector 24 has been irradiated with erasing light from the erasing light source 50 to remove unwanted electric charges from the solid-state detector 24, the corrective image data calculator 58 applies a high voltage to the solid-state detector 24 while it is not being irradiated with the radiation X. The corrective image data calculator 58 moves the reading light source 48 in the directions indicated by the arrows C (see FIG. 1) and applies reading light from the reading light source 48 to the solid-state detector 24. The corrective image data calculator 58 reads corrective image data from the non-exposure area 46 and the exposure area 47 of the solid-state detector 24 in step S2. The read corrective image data represent offset data of the solid-state detector 24 which tend to vary due to changes in the temperature of the environment in which the mammographic system 20 is used and noise from nearby electronic circuits. The corrective image data acquired from the non-exposure area 46 will hereinafter be referred to as non-exposure image data, and the corrective image data acquired from the exposure area 47 prior to being irradiated with the radiation as unexposed image data.

Then, the corrective image data calculator 58 extracts low-frequency unexposed image data $R0(L)$ as a low-frequency component from the unexposed image data acquired from the exposure area 47 in step S3. Since the low-frequency unexposed image data $R0(L)$ may possibly vary in a short period of time due to changes in the temperature of the environment in which the mammographic system 20 is used, it is desirable to acquire the low-frequency unexposed image data $R0(L)$ when the mammographic system 20 is switched on or immediately before the mammographic system 20 captures a radiation image.

A high-frequency component of the unexposed image data has small time-dependent variations as it is considered to vary due to changes in the sensitivity of the solid-state detector 24 and characteristic changes of nearby electronic circuits. Therefore, the high-frequency component of the unexposed image data may be acquired at longer intervals than the low-frequency component, e.g., once a week.

If the console 52 issues an instruction to generate high-frequency unexposed image data in step S4, then the corrective image data calculator 58 acquires unexposed image data as corrective image data from the exposure area 47 of the solid-state detector 24 while it is not being irradiated with the radiation X in step S5. A high-frequency component of the unexposed image data is considered to vary due to noise of nearby electronic circuits. Therefore, the corrective image data calculator 58 acquires unexposed image data a plurality of times, and calculates average values of the acquired plural sets of unexposed image data with respect to the respective pixels of the solid-state detector 24 in step S6. Then, the corrective image data calculator 58 extracts high-frequency unexposed image data $R0(H)$ as a high-frequency component of the unexposed image data in step S7.

It takes a certain period of time for the corrective image data calculator 58 to read the plural sets of unexposed image data because the reading light source 48 needs to move along the solid-state detector 24. However, as described above, the corrective image data calculator 58 acquires the high-frequency component of the unexposed image data less frequently than it acquires the low-frequency component of the unexposed image data. Accordingly, if the high-frequency unexposed image data R0(H) are acquired in an idle time of the mammographic system 20, then the acquisition of the high-frequency unexposed image data R0(H) presents no obstacle to the usual process of capturing radiation images.

Figure 5:
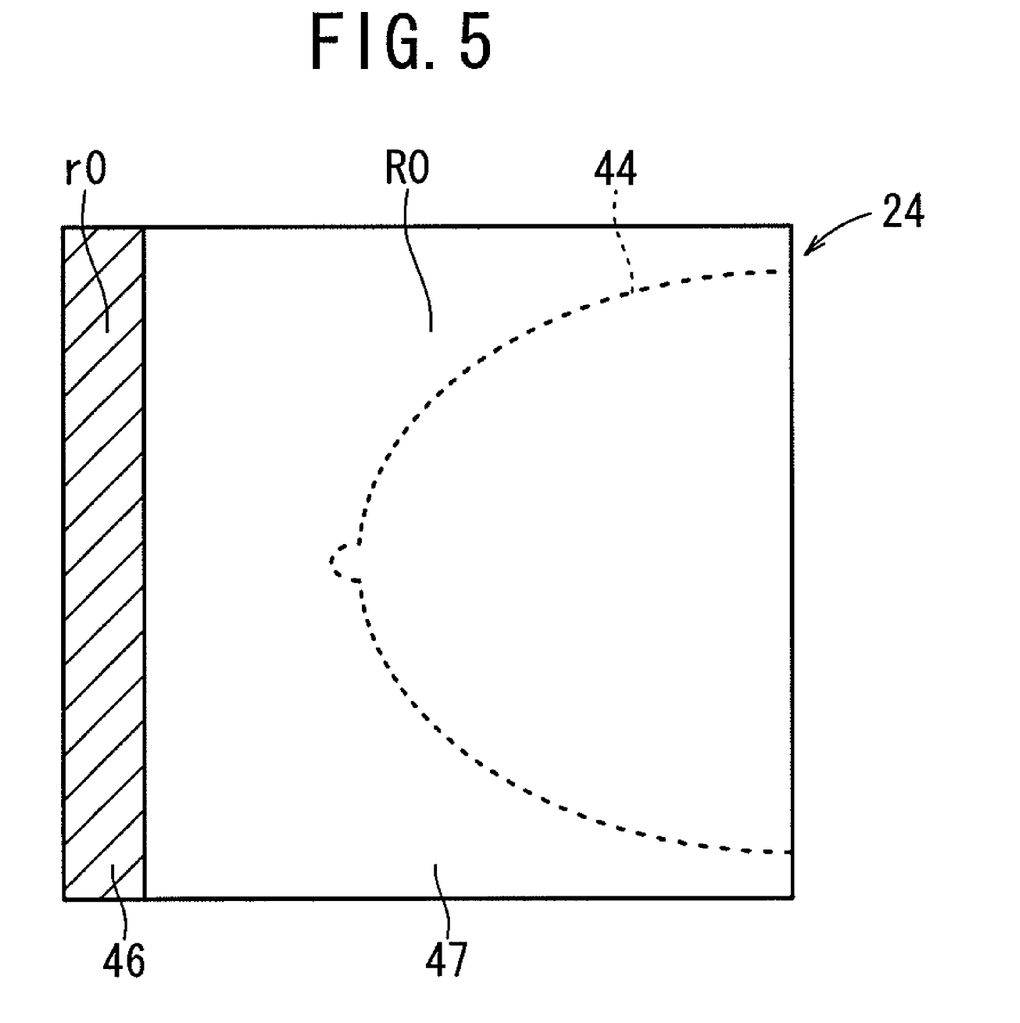
FIG. 5 is a diagram showing image data acquired from a radiation detector when no radiation is applied to the radiation detector.

The corrective image data calculator 58 adds the low-frequency unexposed image data R0(L) extracted in step S3 and the high-frequency unexposed image data R0(H) extracted in step S7 to each other, thereby producing unexposed image data R0 (see FIG. 5) in step S8. Then, the corrective image data calculator 58 calculates an average value of the non-exposure image data which have been acquired from the non-exposure area 46 in step S2, as non-exposure image data r0 (see FIG. 5) in step S9. The unexposed image data R0 and the non-exposure image data r0 are stored in the corrective image storage 60 in step S10.

Then, the breast 44 is placed on the image capturing base 36, and the radiation X is emitted from the radiation source 22 to capture a radiation image of the breast 44 in step S11.

Figure 6:
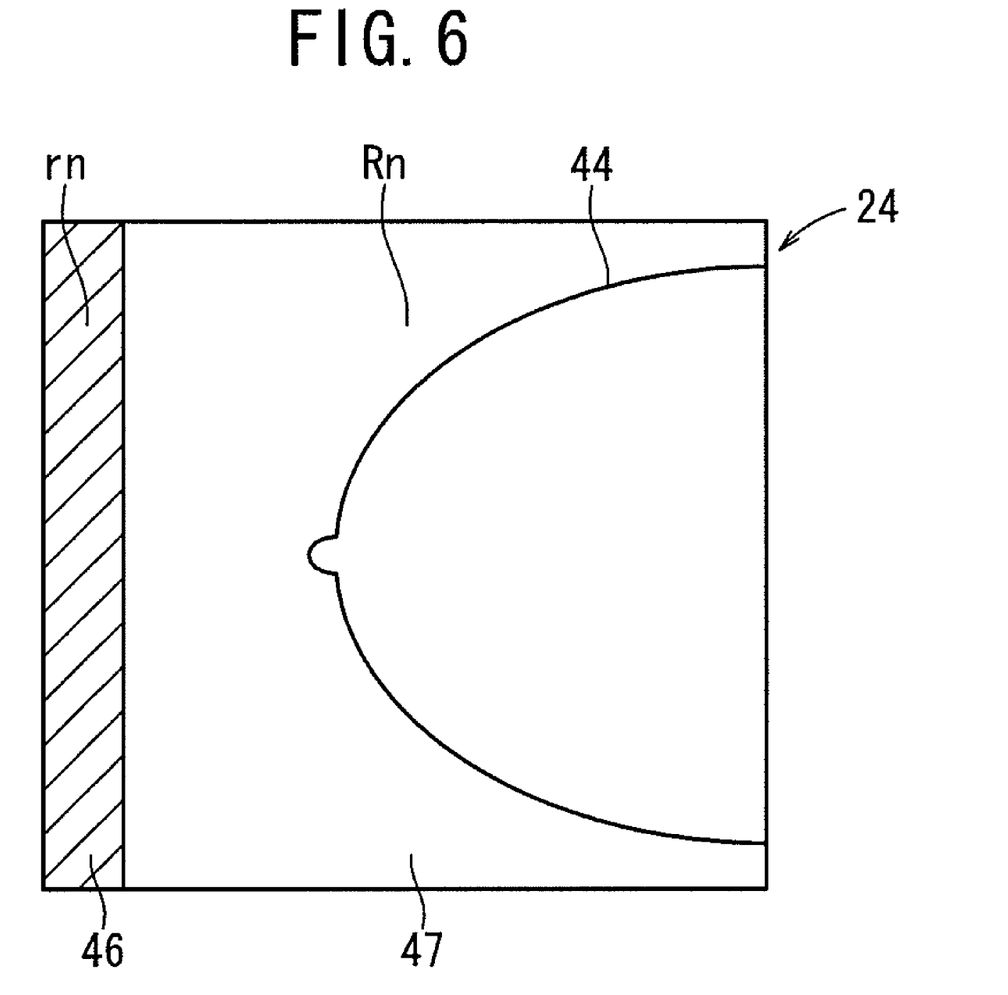
FIG. 6 is a diagram showing image data acquired from the radiation detector when a radiation is applied to the radiation detector.

The image processor 56 acquires exposed image data Rn of the radiation image of the breast 44 from the exposure area 47 of the solid-state detector 24, and also acquires non-exposure image data from the non-exposure area 46 of the solid-state detector 24 and uses an average value thereof as non-exposure image data rn (see FIG. 6) in step S12. Since the shield plate 42 for blocking the radiation X is mounted on the non-exposure area 46 of the solid-state detector 24, the non-exposure image data rn are obtained as offset data of the solid-state detector 24 free of the effect of the radiation X at the time the exposed image data Rn are acquired.

The correction processor 62 adjusts the unexposed image data R0 stored in the corrective image storage 60 according to a variation of the non-exposure image data rn obtained from the non-exposure area 46 when the exposed image data Rn were acquired, with respect to the non-exposure image data r0 obtained from the non-exposure area 46 when the unexposed image data R0 were acquired in step S13.

The unexposed image data R0 may be adjusted by a subtracting process or a dividing process. According to the subtracting process, the unexposed image data R0 are adjusted by the equation:

$$R0' = R0 + (rn - r0)$$

to produce corrective image data R0'. According to the dividing process, the unexposed image data R0 are adjusted by the equation:

$$R0' = R0 \times (rn/r0)$$

to produce corrective image data R0'.

The correction processor 62 corrects the exposed image data Rn using the corrective image data R0' calculated in step S13, according to the equation:

$$Rn' = Rn - R0'$$

to produce corrected exposed image data Rn' in step S14. The corrected exposed image data Rn' are stored in the exposed image data storage 64 in step S15. If necessary, the corrected exposed image data Rn' are displayed on the console 52 or sent through a network, not shown, for diagnosis by the doctor or the like.

The light-reading-type solid-state detector 24 may be replaced with a radiation detector which reads electric charge information representing a stored radiation image directly as an electric signal.

Although a certain preferred embodiment of the present invention has been shown and described in detail, it should be understood that various changes and modifications may be made therein without departing from the scope of the appended claims.

What is claimed is:

1. An apparatus for capturing a radiation image, comprising:
   a radiation source for emitting a radiation to be applied to a subject;
   a radiation detector for detecting the radiation which has passed through said subject, said radiation detector including an exposure area for being irradiated with said radiation and an non-exposure area for being not irradiated with said radiation;
   corrective image data acquiring means for acquiring unexposed image data RO and non-exposure image data rO respectively from said exposure area and said non-exposure area, as corrective image data, while said radiation detector is not being irradiated with said radiation; and
   exposed image data correcting means for acquiring exposed image data Rn and non-exposure image data rn respectively from said exposure area and said non-exposure area while said radiation detector is being irradiated with said radiation through said subject, adjusting said unexposed image data RO according to a variation of said non-exposure image data rn with respect to said non-exposure image data rO, and correcting said exposed image data Rn based on the adjusted unexposed image data RO, wherein said
   exposed image data correcting means adjusts said unexposed image data RO according to a variation of an average value of said non-exposure image data rn with respect to an average value of said non-exposure image data rO.

2. An apparatus for capturing a radiation image, comprising:
   a radiation source for emitting a radiation to be applied to a subject;
   a radiation detector for detecting the radiation which has passed through said subject, said radiation detector including an exposure area for being irradiated with said radiation and an non-exposure area for being not irradiated with said radiation;
   corrective image data acquiring means for acquiring unexposed image data RO and non-exposure image data rO respectively from said exposure area and said non-exposure area, as corrective image data, while said radiation detector is not being irradiated with said radiation; and
   exposed image data correcting means for acquiring exposed image data Rn and non-exposure image data rn respectively from said exposure area and said non-exposure area while said radiation detector is being irradiated with said radiation through said subject, adjusting said unexposed image data RO according to a variation of said non-exposure image data rn with respect to said non-exposure image data rO, and correcting said exposed image data Rn based on the adjusted unexposed image data RO, wherein said corrective image data acquiring means acquires said corrective image data comprising a low-frequency component of said unexposed image data R0 and a high-frequency component of an average value of a plurality of sets of said unexposed image data R0.

3. A method of capturing a radiation image by applying a radiation emitted from a radiation source to a subject and detecting the radiation which has passed through said subject with a radiation detector, said radiation detector including an exposure area for being irradiated with said radiation and an non-exposure area for being not irradiated with said radiation, and said method comprising the steps of:

dividing a detecting area of said radiation detector into an exposure area for being irradiated with said radiation and an non-exposure area for being not irradiated with said radiation;

acquiring unexposed image data R0 and non-exposure image data r0 respectively from said exposure area and said non-exposure area, as corrective image data, while said radiation detector is not being irradiated with said radiation;

acquiring exposed image data Rn and non-exposure image data rn respectively from said exposure area and said non-exposure area while said radiation detector is being irradiated with said radiation through said subject;

adjusting said unexposed image data R0 according to a variation of said non-exposure image data rn with respect to said non-exposure image data r0; and correcting said exposed image data Rn based on the adjusted unexposed image data R0, wherein said step of adjusting said unexposed image data R0 comprises the step of adjusting said unexposed image data R0 according to a variation of an average value of said non-exposure image data rn with respect to an average value of said nonexposure image data r0.

4. A method of capturing a radiation image by applying a radiation emitted from a radiation source to a subject and detecting the radiation which has passed through said subject with a radiation detector, said radiation detector including an exposure area for being irradiated with said radiation and an non-exposure area for being not irradiated with said radiation, and said method comprising the steps of:

dividing a detecting area of said radiation detector into an exposure area for being irradiated with said radiation and an non-exposure area for being not irradiated with said radiation;

acquiring unexposed image data R0 and non-exposure image data r0 respectively from said exposure area and said non-exposure area, as corrective image data, while said radiation detector is not being irradiated with said radiation;

acquiring exposed image data Rn and non-exposure image data rn respectively from said exposure area and said non-exposure area while said radiation detector is being irradiated with said radiation through said subject;

adjusting said unexposed image data R0 according to a variation of said non-exposure image data rn with respect to said non-exposure image data r0; and correcting said exposed image data Rn based on the adjusted unexposed image data R0, wherein said step of acquiring unexposed image data R0 comprises the steps of acquiring a low-frequency component of said unexposed image data R0, acquiring a high-frequency component of an average value of a plurality of sets of said unexposed image data R0, and generating said unexposed image data R0 comprising said low-frequency component and said high-frequency component.

5. A method according to claim 4, wherein said high-frequency component is acquired at a time interval longer than a time interval at which said low-frequency is acquired.

* * * * *